(12) United States Patent
Takeuchi

(10) Patent No.: US 6,980,344 B2
(45) Date of Patent: Dec. 27, 2005

(54) SCANNING OPTICAL SYSTEM

(75) Inventor: Shuichi Takeuchi, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 17 days.

(21) Appl. No.: 10/600,697

(22) Filed: Jun. 23, 2003

(65) Prior Publication Data
US 2004/0085603 A1    May 6, 2004

(30) Foreign Application Priority Data
Jun. 24, 2002  (JP)  ............................ 2002-182700

(51) Int. Cl.[7] ........................................ G02B 26/08
(52) U.S. Cl. .................................. 359/212; 359/205
(58) Field of Search ........................ 359/212, 216–218, 359/205

(56) References Cited

U.S. PATENT DOCUMENTS

| | | | | |
|---|---|---|---|---|
| 4,578,688 A | * | 3/1986 | Okuno | ........................ 347/118 |
| 4,796,965 A | | 1/1989 | Ishikawa | |
| 5,438,450 A | * | 8/1995 | Saito | .......................... 359/216 |
| 6,091,533 A | | 7/2000 | Iizuka | |
| 6,166,843 A | | 12/2000 | Iizuka | |
| 6,400,486 B1 | * | 6/2002 | Iizuka | ........................ 359/205 |
| 2002/0167709 A1 | | 11/2002 | Sowa et al. | |

* cited by examiner

*Primary Examiner*—Euncha P. Cherry
(74) *Attorney, Agent, or Firm*—Greenblum & Bernstein, P.L.C.

(57) ABSTRACT

A scanning optical system includes a deflector that deflects a light beam toward an object surface such that the light beam is scanned over the object surface in a main scanning direction. A mirror system reflects back the light beam so that the light beam travels toward the object surface after being deflected twice by the deflector. The mirror system reflects back the light beam such that a projection of the light beam on an auxiliary scanning section, which is a plane perpendicular to the main scanning direction, is incident on the reflection surface for a first time at an incident angle different from an incident angle at which the projection of the light beam is incident on the reflection surface for a second time. A blocking member is provided to prevent the unwanted light flux from striking the object surface while allowing the light beam scanning the object surface.

15 Claims, 7 Drawing Sheets

SCANNING OPTICAL SYSTEM

BACKGROUND OF THE INVENTION

The present invention relates to a scanning optical system for printing apparatuses such as printers, facsimile machines, copy machines, or the like.

In a scanning optical system, a laser beam is deflected by a reflection type deflector such as a polygon mirror or a galvano-mirror. The deflected laser beam is then converged by an imaging optical system to form a beam spot on a surface of a photo-sensitive drum, or an object surface. The deflector deflects the laser beam so that the beam spot moves across the object surface in a main scanning direction at a constant speed. In the meantime, the laser beam is modulated ON/OFF in accordance with image information so that an image made up of a plurality of dots is formed on the object surface.

Recently, some scanning optical systems are arranged so as to deflect the laser beam twice by the deflector before directing the laser beam toward the object surface, which systems will be referred to hereinafter as double reflection type scanning optical systems. FIG. 1 schematically shows a side view of a conventional double reflection type scanning optical system 10 observed from the main scanning direction.

In order to deflect the laser beam twice, a pair of mirrors (first and second mirrors 12 and 13), each of which extends in parallel with the main scanning direction, are arranged near a polygon mirror 11 in parallel to the auxiliary scanning direction. The polygon mirror 11 is driven to revolve about an axis 11a. A laser beam incident on a reflection surface of the polygon mirror 11 is reflected toward the first mirror 12 and then to the second mirror 13. The second mirror 13 reflects the laser beam back to the reflection surface of the polygon mirror 11. Then, the laser beam is deflected by the polygon mirror 11 for the second time and travels through between the first and second mirrors 12 and 13 toward the object surface to be scanned via an imaging lens 14.

The inclination of the first and second mirrors 12 and 13 are adjusted such that the laser beam incident on the polygon mirror 11 for the second time (after being reflected by the first and second mirrors 12 and 13) is parallel with the laser beam striking the polygon mirror 11 for the first time when observed from the main scanning direction. Accordingly, the laser beam reflected by the polygon mirror 11 for the second time is also parallel with the laser beam reflected for the first time (when observed from the main scanning direction).

In many cases, light incident on the polygon mirror 11 includes not only the laser beam for forming the beam spot on the object surface, which will be referred to hereinafter as a regular beam, but also unwanted light fluxes. The unwanted light fluxes include, for example, light generated by diffraction that occurs as the laser beam passes through an aperture stop and/or flare generated as the laser beam passes through a collimator lens.

Such unwanted light fluxes travel in a vicinity of and in parallel with the regular beam. Most of the unwanted light fluxes are reflected by the polygon mirror 11 toward the first mirror 12 like the regular beam. The unwanted light fluxes are then partially reflected by the first mirror 12 toward the second mirror 13. The remaining pass by the first mirror 12 and travel directly toward the object surface as shown in FIG. 2, which is a top view of the scanning optical system shown in FIG. 1. Note that, in FIG. 2, an unwanted light flux that travels toward the object surface after being deflected by the polygon mirror 11 only once is indicated by solid lines, while the regular beam that is deflected twice is indicated by broken lines.

As with the regular beam, the unwanted light fluxes deflected twice by the polygon mirror 11 are scanned across the object surface. The object surface, however, will be scarcely exposed to these unwanted light fluxes because these unwanted light fluxes have much lower light intensity compared to the regular beam while being scanned over the object surface at the same scanning speed as the regular beam.

On the other hand, the unwanted light fluxes that pass by the first mirror 12 are scanned over the object surface at a much slower scanning speed compared to the regular beam. These unwanted light fluxes are deflected by the deflector only once before reaching the object surface. Therefore, the angle for which these unwanted light fluxes are deflected, and hence the scanning speed thereof is half of that of the regular beam. This low scanning speed allows the unwanted light fluxes to expose the object surface and thereby form a ghost image thereon.

Therefore, there is need for a double reflecting type scanning optical system that is capable of preventing an object surface from being exposed by unwanted light fluxes that are deflected only once by a deflector.

SUMMARY OF THE INVENTION

The present invention is advantageous in that a scanning optical system is provided that satisfies the above-mentioned need.

According to an aspect of the invention, there is provided a scanning optical system that includes a deflector having a reflection surface pivoting about an rotation axis. The reflection surface deflects a light beam toward an object surface such that the light beam is scanned over the object surface in a main scanning direction. A mirror system is provided to the scanning optical system, which is arranged to reflect back the light beam deflected by the reflection surface so that the light beam travels toward the object surface after being deflected twice by said deflector.

The mirror system reflects back the light beam such that a projection of the light beam on an auxiliary scanning section, which is a plane perpendicular to the main scanning direction, is incident on the reflection surface for a first time at a first incident angle that is different from a second incident angle at which the projection of the light beam is incident on the reflection surface for a second time.

In the scanning optical system arranged as described above, unwanted light fluxes, which impinge onto the reflection surface of the deflector substantially in parallel with the light beam and travel toward the object surface after being deflected by the reflection surface only once, are inclined against the light beam that travel toward the object surface after being deflected twice by the reflection surface and becomes completely separated from the light beam.

The unwanted light flux being separated from the light beam allows it to be blocked by a blocking member disposed between the deflector and the object surface so as not to interfere with the light beam. In other words, a blocking member can prevent the unwanted light flux from striking and forming a ghost image on the object surface while allowing the light beam scanning over the object surface.

The blocking member may be an opaque member or a mirror that reflects the unwanted light flux in a direction other than toward the object surface.

Optionally, the blocking member may be disposed so as to prevent the unwanted light flux from striking the object surface shortly before the light beam enters a scanning area defined on the object surface. Alternatively, the scanning optical system may further include an optical sensor that detects the position of the light beam deflected by the deflector to determine the timing of initiating modulation of the light beam, and the blocking member may be disposed so as to block the unwanted light flux when the light beam is striking the optical sensor.

BRIEF DESCRIPTION OF THE ACCOMPANYING DRAWINGS

DETAILED DESCRIPTION OF THE EMBODIMENTS

Hereinafter, a scanning optical system 100 according to an embodiment of the present invention will be described with reference to the accompanying drawings.

Figure 1:
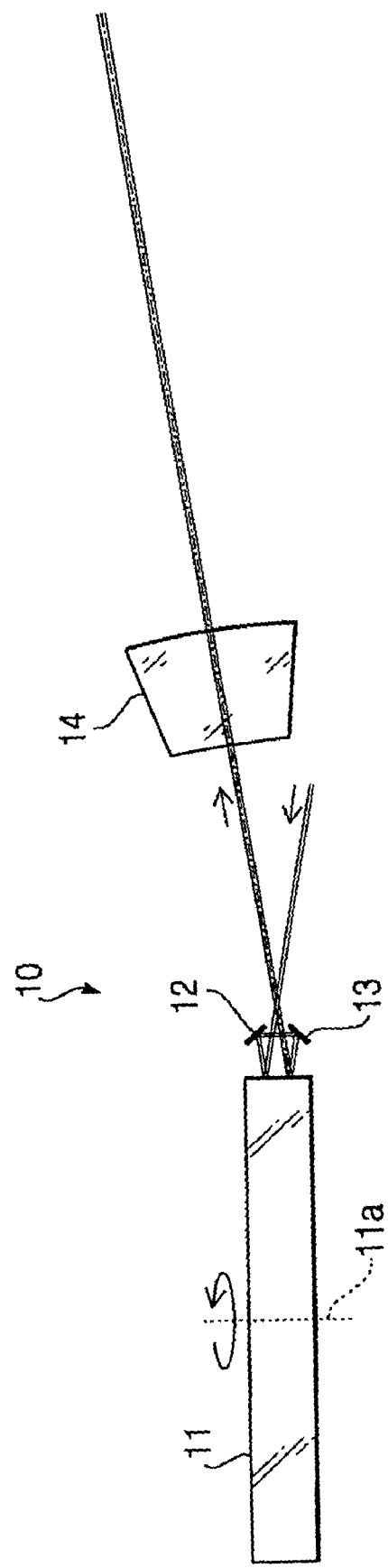
FIG. 1 shows a side view of a conventional double reflection type scanning optical system.
Figure 2:
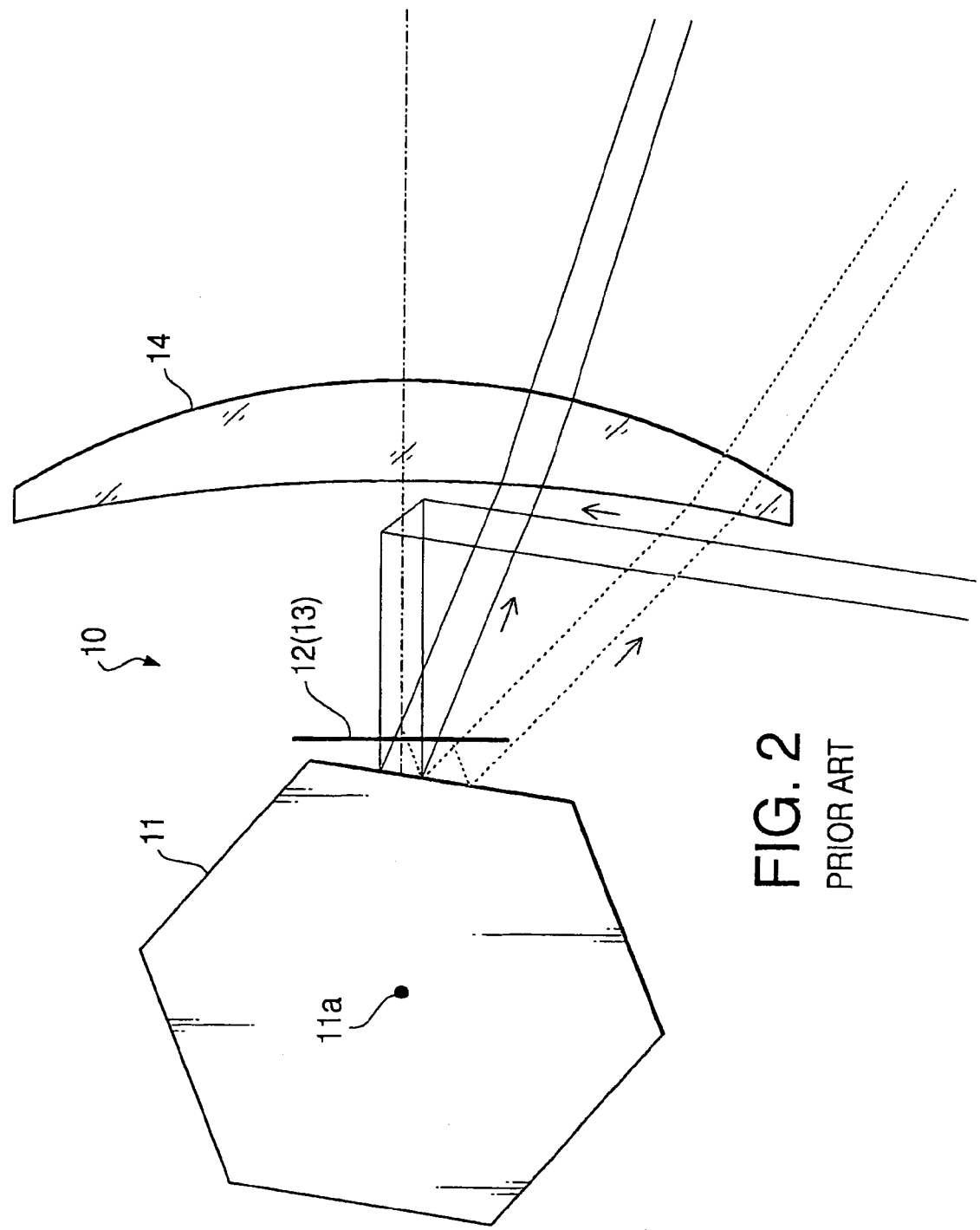
FIG. 2 is a top view of the scanning optical system shown in FIG. 1.
Figure 3:
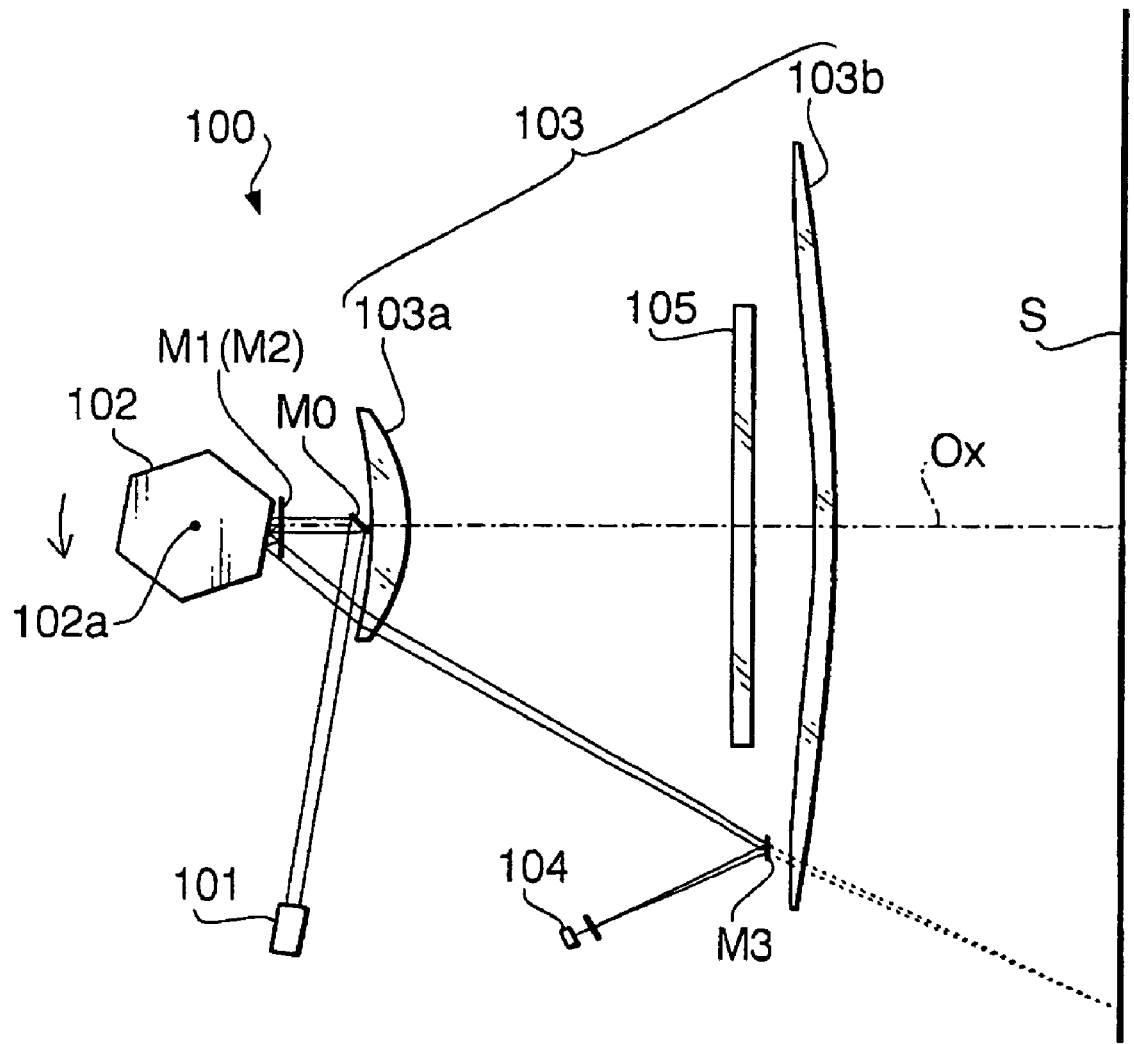
FIG. 3 shows a top view of a scanning optical system according to an embodiment of the invention.

FIG. 3 schematically shows a plane view of the scanning optical system 100 according to the embodiment of the invention.

The scanning optical system 100 shown in FIG. 3 includes a light source unit 101, a polygon mirror 102, a scanning lens system (fθ lens system) 103, a light receiving element 104, a folding mirror M0, first and second mirrors M1 and M2, a folding mirror M3, and a blocking member 105.

The light source unit 101 includes a laser source (not shown) such as a semiconductor laser that emits a divergent laser beam, and a collimator lens (not shown) that converts the laser beam emitted from the laser source into a parallel light flux.

The polygon mirror 102 is a relatively thin hexagonal plate. Each of the six side surfaces thereof is formed as a reflection surface. The polygon mirror 102 is arranged to rotate about a rotation axis 102a at a constant angular speed.

The fθ lens system 103 is constructed from first and second lenses 103a and 103b and designed to have a scanning speed correction function. That is, a beam spot formed by the laser beam passed through the fθ lens system 103 moves with a constant linear velocity as the polygonal mirror 102 rotates at a constant revolving speed. The fθ lens system 103 is arranged such that an optical axis $O_x$ thereof lies in a plane in which the rotation axis 102a of the polygon mirror 102 also lies, which plane will be referred to hereinafter as an auxiliary scanning section.

Figure 4:
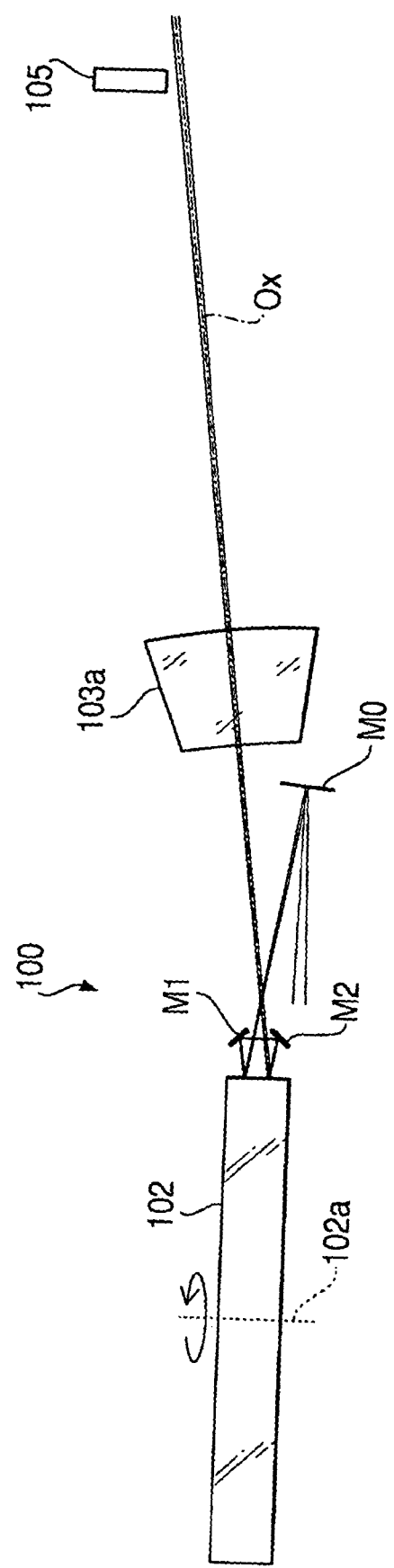
FIG. 4 shows a side view of a part of the scanning optical system shown in FIG. 3 along with a regular beam.

FIG. 4 shows the scanning optical system 100 shown in FIG. 3, in the auxiliary scanning section. Note that the laser source unit 101 and the second lens 103b of the fθ lens system 103 are not shown in FIG. 4.

As shown in FIG. 4, the fθ lens system 103 is arranged such that the optical axis $O_x$ is slightly inclined against a plane perpendicular to the rotation axis 102a in a counterclockwise direction.

Referring back to FIG. 3, the folding mirror M0 reflects the laser beam emitted from the laser source unit 101 toward the reflection surfaces of the polygon mirror 102. The folding mirror M0 is disposed between the polygon mirror and the fθ lens system 103 at a location closer to the fθ lens system 103. The laser beam reflected by the folding mirror M0 travels along the auxiliary scanning section as can be seen in FIG. 3.

As can be seen in FIG. 4, the laser beam reflected by the folding mirror M0 is slightly inclined against the plane perpendicular to the rotation axis 102a of the polygon mirror 102 in clockwise direction.

The first and second mirrors M1 and M2 are elongated rectangular mirrors. The first and second mirrors M1 and M2 are disposed between the polygon mirror 102 and the fθ lens system 103 perpendicularly to the auxiliary scanning section. Each of the first and second mirrors M1 and M2 intersects the auxiliary scanning section at the center in the longitudinal direction thereof. Further, the first and second mirrors M1 and M2 are arranged on a line parallel to the rotation axis 102a of the polygon mirror 102.

The first mirror M1 is arranged so as to reflect the laser beam deflected by the polygon mirror 102 toward the second mirror M2. The second mirror M2 reflects the laser beam coming from the first mirror M1 back to the polygon mirror 102 to allow the laser beam to be deflected for a second time. If the reflection surface of the polygon mirror 102 facing the first and second mirrors M2 is located perpendicular to the auxiliary scanning section, the laser beam reflected by the second mirror M2 strikes the reflection surface at a point at which the optical axis $O_x$ of the fθ lens intersects the reflection surface.

In the present embodiment, the direction of the reflection surfaces of the first and second mirrors M1 and M2 are adjusted such that, in the auxiliary scanning section as shown in FIG. 4, the incident angle of the laser beam impinging onto the reflection surface of the polygon mirror 102 for the second time (i.e. after being reflected by the first and second mirrors M1 and M2) differs from that of the laser beam striking the reflection surface for the first time (i.e. before being reflected by the first and second mirrors M1 and M2).

In the scanning optical system 100 shown in FIGS. 3 and 4, the laser beam emitted from the laser source unit 101 is reflected by the folding mirror M0 toward the polygon mirror 102 rotating about the rotation axis 102a. The laser beam then strikes one of the reflecting surfaces of the polygon mirror 102. The reflecting surface deflects the laser beam for the first time for an angle that changes as the polygon mirror rotates.

The deflected laser beam is then reflected by the first and second laser mirrors M1 and M2, in sequence, and strikes again the same reflecting surface of the polygon mirror 102. Thus, the laser beam is deflected by the polygon mirror 102 for the second time.

The laser beam deflected twice by the same reflection surface of the polygon mirror 102 passes between the first and second mirrors M1 and M2 and through the fθ lens system 103. The laser beam is converged by the fθ lens system 103 to form a beam spot on the object surface S. The beam spot scans across the object surface S in the main scanning direction at a constant speed. In this way, the beam spot forms a linear line, or a scanning line, on the object surface S.

While the beam spot scans across the object surface, the object surface is moved at a constant speed in an auxiliary scanning direction which is perpendicular to the main scanning direction and parallel to the object surface S. Therefore, a plurality of scanning lines will be formed on the object surface S by repeating the scanning of the beam spot.

The laser beam scanning the object surface S is also modulated ON/OFF by a not shown modulator (which may be a part of the light source unit 101) in accordance with image information so that a two dimensional image made up of a plurality of dots is formed on the object surface.

The folding mirror M3 is disposed between the first and second lenses 103a and 103b such that the laser beam deflected by the polygon mirror 102 impinges onto the folding mirror M3 shortly before starting each scan of the object surface S. The folding mirror M3 reflects the laser beam toward the light receiving element 104.

The light receiving element 104 outputs, whenever it has detected the laser beam, a horizontal synchronizing signal to the not shown modulator. The modulator keeps the laser beam at an off state thereof for a predetermined time period after it has received the horizontal synchronizing signal. Then, the modulator starts to modulate the laser beam in accordance with the image information corresponding to the scanning line to be scanned. In this way, the timing of exposing each scanning line is controlled.

Figure 5:
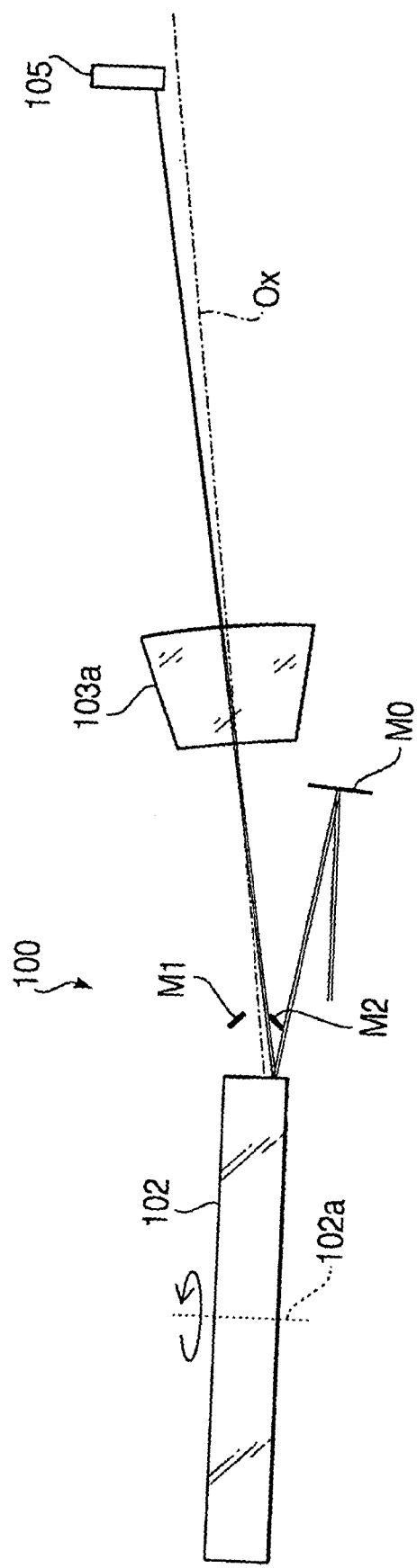
FIG. 5 shows the side view of the scanning optical system shown in FIG. 3 along with an exemplary unwanted light flux.

As previously described, the laser beam that forms the beam spot on the object surfaces, or the regular beam, is not the only light flux that is incident on and deflected by the polygon mirror 102. There are also unwanted light fluxes that impinge onto the reflection surface of the polygon mirror 102 and travel toward the object surface S after being deflected by the polygon mirror 102 only once. FIG. 5 shows the side view of the scanning optical system along with an exemplary one of such unwanted light fluxes in the auxiliary scanning direction. The unwanted light flux shown in FIG. 5 is undesirable since it forms a ghost image on the object surfaces S.

The blocking member 105 is disposed between the first and second lenses 103a and 103b, as shown in FIG. 3, in order to prevent such unwanted light flux from exposing the object surface S. The blocking member may be an opaque member that blocks the unwanted light flux or a mirror that reflects the unwanted light fluxes to a direction other than to the object surface S. The blocking member may be an independent member provided into a casing for accommodating the scanning optical system or may even a part of the casing.

As described above, the scanning optical system 100 according to the present embodiment of the invention is configured such that the laser beam, or the regular beam, is deflected twice by the same reflection surface of the polygon mirror 102 before traveling toward the object surface S. Further, the scanning optical system 100 is configured such that, in the auxiliary scanning section, the incident angle of the regular beam (and the unwanted light flux) impinging onto the polygon mirror 102 for the first time differs from that of the regular beam striking the polygon mirror 102 for the second time. Therefore, the unwanted light flux, which is deflected by the polygon mirror 102 only once, travels in a direction slightly different from that of the regular beam that is deflected twice as may be understood by comparing FIGS. 4 and 5. In other words, the unwanted light flux and the regular beam travel along separate light paths. Thus, the blocking member 105 can be disposed to block the unwanted light flux without interfering with the regular beam.

Figure 6:
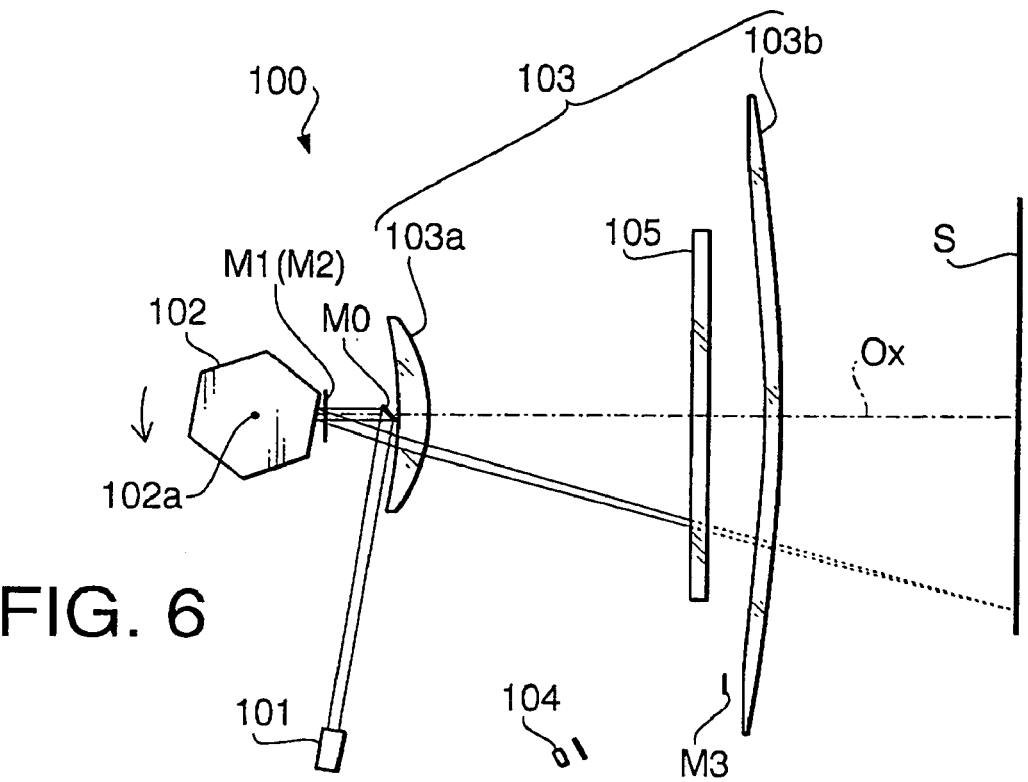
FIG. 6 shows a top view of the scanning optical system according to the embodiment of the invention along with the unwanted light flux.

FIG. 6 shows a top view of the scanning optical system 100 according to the present embodiment along with the exemplary unwanted light flux. The blocking member 105 is an elongated member disposed in parallel to the main scanning direction. In the present embodiment, the length and location of the blocking member 105 is determined such that the blocking member 105 blocks the unwanted light flux for the entire scanning range thereof (or such that the object surface S will not be exposed over the entire width thereof by the unwanted light flux).

Figure 7:
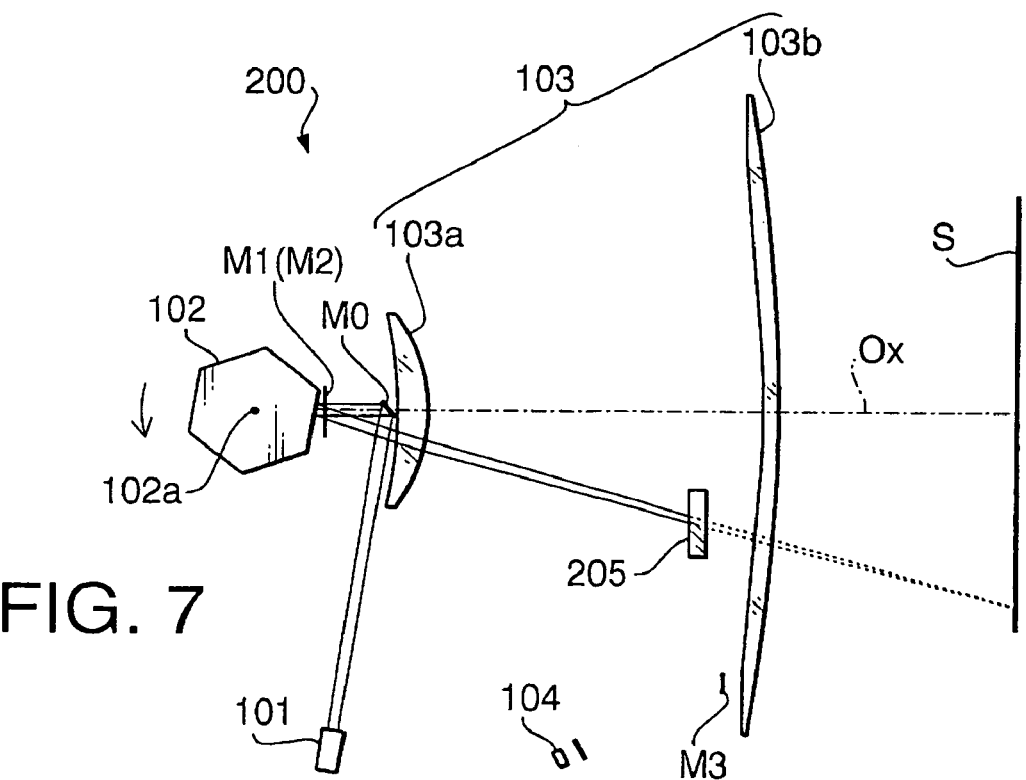
FIG. 7 shows a top view of a variation of the scanning optical system shown in FIG. 6 along with the unwanted light flux.

FIG. 7 shows a top view of a variation of the scanning optical system shown in FIG. 6 along with the exemplary unwanted light flux deflected by the polygon mirror 102 only once. The scanning optical system 200 shown in FIG. 7 has the same configuration as the scanning optical system 100 shown in FIG. 6 except that it is provided with a blocking member 205 that is arranged so as to block the unwanted light flux only when the regular beam is incident on the light receiving element 104.

It should be noted that the deflection angle of the unwanted light flux reflected only once by the polygon mirror 102 is substantially the half of the deflection angle of the regular beam reflected by the polygon mirror 102 twice. This difference between the deflection angles causes the unwanted light flux to be directed to the object surface S at the time the regular beam is incident on the light receiving element 104 (or folding mirror M3).

It should be also noted that the laser source unit 101 is controlled by the not shown modulator so as to emit the laser beam whenever the regular beam will be directed by the polygon mirror 102 toward the light receiving element 104 (the folding mirror M3). This means that the unwanted light flux always exist at the time the regular beam is incident on the light receiving element 104, which unwanted light flux is deflected toward the object surface S and exposes the object surface S at a specific location in the main scanning direction. If the scanning process is repeated, this unwanted light flux may form a ghost image that extends linearly in the auxiliary direction.

In the scanning optical system shown in FIG. 7, however, such ghost image will not be formed since the blocking member 205 prevents the unwanted light flux from traveling toward the object surface S at the time the regular beam is incident on the light receiving element 104.

Figure 8A:
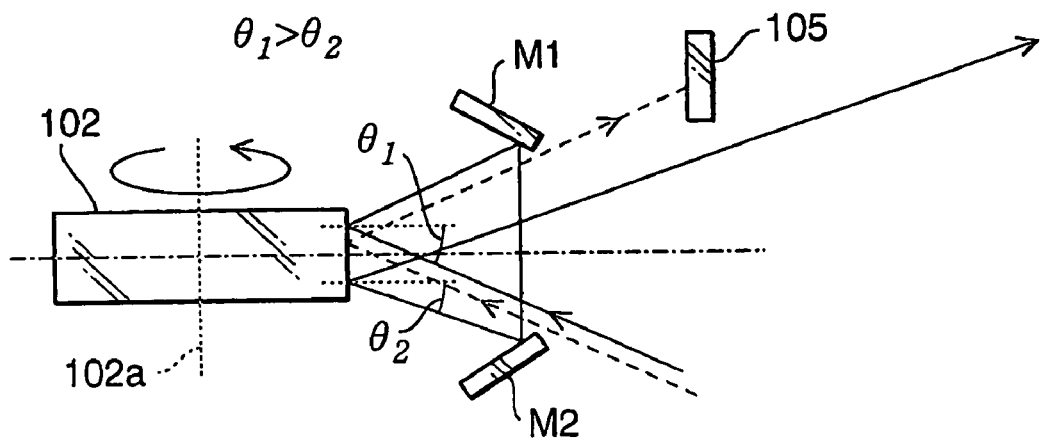
FIGS. 8A through 8C show relations between the incident angles and reflected directions of a regular beam and the unwanted light flux incident on the reflection surface of the polygon mirror.
Figure 8B:
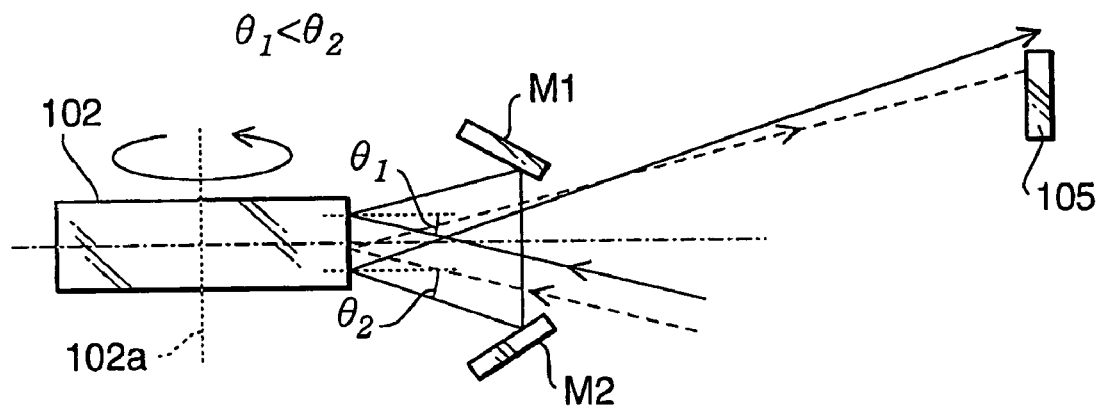
Figure 8C:
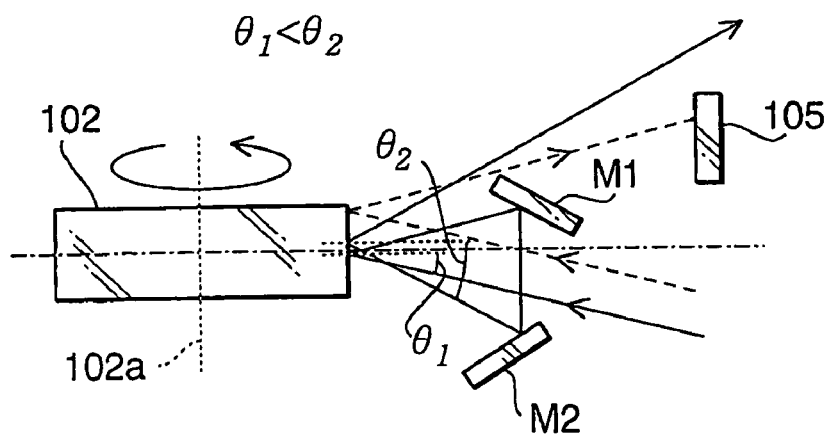

FIGS. 8A through 8C show relations between the incident angles and reflected directions of the regular beam and the unwanted light flux incident on the reflection surface of the polygon mirror 102. Note that each of FIGS. 8A through 8C shows the regular beam (indicated by a solid line) and the unwanted light flux (indicated by a broken line) observed from the main scanning direction. Further, angles θ1 and θ2 in FIGS. 8A through 8C indicate the incident angles of the regular beam impinging onto the reflection surface of the polygon mirror 102 for the first and second time, respectively.

It should be also note that the incident angles θ1 and θ2 in each of FIGS. 8A through 8C represent the inclination of the projection of the regular beams on the auxiliary scanning section against the reflection surface of the polygon mirror 102.

Further, the angle θ1 also represents the incident angle of the unwanted light flux striking the reflection surface of the polygon mirror 102 since the unwanted light flux travels toward the polygon mirror 102 substantially in parallel with the regular beam.

In FIG. 8A, the first and second mirrors M1 and M2 are arranged such that the incident angle θ1 of the regular beam deflected by the polygon mirror for the first time is larger than the incident angle θ2 for the second time, and such that both of the regular beam and the unwanted light flux travel through between the first and second mirrors M1 and M2 after being reflected by the polygon mirror 102. In this case, the unwanted light flux deflected by the polygon mirror only once is slightly inclined against the regular beam in a counterclockwise direction in FIG. 8A. As a result, the light path of the unwanted light flux becomes apart from that of the regular beam as traveling toward the object surface S, which allows the blocking member 105 to block only the unwanted light flux.

In FIG. 8B, the first and second mirrors M1 and M2 are arranged such that the incident angle θ1 is smaller than the incident angle θ2, and such that both of the regular beam and the unwanted light flux travel through between the first and second mirrors M1 and M2 after being reflected by the polygon mirror 102. In this case, the unwanted light flux is slightly inclined against the regular beam in a clockwise direction in FIG. 8B. Again, the light path of the unwanted light flux becomes apart from that of the regular beam and allows the blocking member 105 to block the unwanted light flux without interfering with the regular beam.

In FIG. 8C, the first and second mirrors M1 and M2 are arranged such that the incident angle θ1 is smaller than the incident angle θ2, and such that the regular beam and the unwanted light flux after being reflected by the polygon mirror 102 travel along paths on a opposite side, with respect to the first mirror M1, of the second mirror M2. The unwanted light flux is inclined against the regular beam in a clockwise direction, and allows the blocking member 105 to block only the unwanted light flux.

The present disclosure relates to the subject matter contained in Japanese Patent Application No. P2002-182700, filed on Jun. 24, 2002, which is expressly incorporated herein by reference in its entirety.

What is claimed is:

1. A scanning optical system comprising:
   a deflector having a reflection surface pivoting about a rotation axis, said reflection surface deflecting a light beam toward an object surface such that said light beam is scanned over the object surface in a main scanning direction;
   a mirror system arranged to reflect back said light beam deflected by said reflection surface so that said light beam travels toward the object surface after being deflected twice by said deflector, the mirror system reflecting back said light beam such that a projection of said light beam on an auxiliary scanning section is incident on said reflection surface for a first time at a first incident angle different from a second incident angle at which said projection of said light beam is incident on said reflection surface for a second time, said auxiliary scanning section being perpendicular to said main scanning direction; and
   a blocking member disposed between said deflector and the object surface, said blocking member preventing an unwanted light flux from striking the object surface, the unwanted light flux traveling from said deflector toward the object surface after being deflected by said deflector only once, wherein the difference between the first incident angle and the second incident angle provides separation between a path of the twice deflected light beam and a path of the once deflected unwanted light flux.

2. The scanning optical system according to claim 1,
   wherein said deflector includes a plurality of reflection surfaces, and
   wherein said mirror system reflects back said light beam such that said light beam is deflected twice by the same one of said plurality of reflecting surfaces.

3. The scanning optical system according to claim 1, wherein said blocking member is disposed so as to prevent the unwanted light flux from striking the object surface shortly before the light beam enters a scanning area defined on the object surface.

4. The scanning optical system according to claim 1, further comprising an optical sensor that detects the position of the light beam deflected by said deflector to determine the timing of initiating modulation of the light beam,
   wherein said blocking member is disposed so as to block the unwanted light flux when the light beam is striking said optical sensor.

5. The scanning optical system according to claim 1, wherein said blocking member is an elongated member extending in parallel to said main scanning direction.

6. The scanning optical system according to claim 1, wherein said blocking member is an opaque member.

7. The scanning optical system according to claim 1, wherein said blocking member is a mirror reflecting the unwanted light flux in a direction other than toward the object surface.

8. A scanning optical system comprising:
   a deflector having a reflection surface pivoting about a rotation axis, said reflection surface deflecting a light beam toward an object surface such that said light beam is scanned over the object surface in a main scanning direction;
   a mirror system arranged to reflect back said light beam deflected by said reflection surface so that said light beam travels toward the object surface after being deflected twice by said deflector, the mirror system reflecting back said light beam such that a projection of said light beam on an auxiliary scanning section is incident on said reflection surface for a first time at a first incident angle different from a second incident angle at which said projection of said light beam is incident on said reflection surface for a second time, said auxiliary scanning section being perpendicular to said main scanning direction; and
   a blocking member disposed between said deflector and the object surface, said blocking member preventing a light beam deflected by said deflector only once at the first incident angle from striking the object surface, while permitting a light beam deflected by said deflector a second time at the second incident angle to reach the object surface.

9. The scanning optical system according to claim 8, wherein the difference between the first incident angle and the second incident angle provides separation between a path of the twice deflected light beam and a path of the once deflected light beam.

10. The scanning optical system according to claim 8, wherein said deflector includes a plurality of reflection surfaces, and
wherein said mirror system reflects back said light beam such that said light beam is deflected twice by the same one of said plurality of reflecting surfaces.

11. The scanning optical system according to claim 8, wherein said blocking member is disposed so as to prevent the once deflected light beam from striking the object surface shortly before the twice deflected light beam enters a scanning area defined on the object surface.

12. The scanning optical system according to claim 8, further comprising an optical sensor that detects the position of the twice deflected light beam to determine the timing of initiating modulation of the light beam,
wherein said blocking member is disposed so as to block the once deflected light beam when the twice deflected light beam is striking said optical sensor.

13. The scanning optical system according to claim 8, wherein said blocking member is an elongated member extending in parallel to said main scanning direction.

14. The scanning optical system according to claim 8, wherein said blocking member is an opaque member.

15. The scanning optical system according to claim 8, wherein said blocking member is a mirror reflecting the once deflected light beam in a direction other than toward the object surface.

* * * * *